(12) United States Patent
Wang et al.

(10) Patent No.: US 8,807,902 B2
(45) Date of Patent: Aug. 19, 2014

(54) FASTENER

(75) Inventors: Ting-Jui Wang, Sindian (TW);
Ming-De Wu, Sindian (TW)

(73) Assignee: Fivetech Technology Inc., Taipei (TW)

( * ) Notice: Subject to any disclaimer, the term of this patent is extended or adjusted under 35 U.S.C. 154(b) by 1047 days.

(21) Appl. No.: 12/425,003

(22) Filed: Apr. 16, 2009

(65) Prior Publication Data

US 2010/0003104 A1 Jan. 7, 2010

(30) Foreign Application Priority Data

Jul. 4, 2008 (TW) ................................. 97211960 U

(51) Int. Cl.
*F16B 37/14* (2006.01)
*F16B 37/06* (2006.01)

(52) U.S. Cl.
CPC .................................... *F16B 37/061* (2013.01)
USPC .......................................... 411/431; 411/353

(58) Field of Classification Search
USPC ............... 411/103, 431, 6, 81, 108, 172–173, 411/179, 183, 295, 353, 436; 16/2.2, 2.4
See application file for complete search history.

(56) References Cited

U.S. PATENT DOCUMENTS

| | | | | |
|---|---|---|---|---|
| 4,726,723 A | * | 2/1988 | Bainbridge | 411/432 |
| 5,131,796 A | * | 7/1992 | Herum et al. | 411/222 |
| 5,290,131 A | * | 3/1994 | Henriksen | 411/180 |
| 5,553,984 A | * | 9/1996 | Smith | 411/429 |
| 6,183,181 B1 | * | 2/2001 | Leistner et al. | 411/177 |
| 6,641,343 B1 | * | 11/2003 | Duran | 411/372.6 |
| 6,719,511 B2 | * | 4/2004 | Notaro et al. | 411/431 |
| 6,764,264 B2 | * | 7/2004 | Lin | 411/431 |
| 6,814,530 B2 | * | 11/2004 | Franco et al. | 411/353 |
| 7,213,321 B2 | * | 5/2007 | Franco et al. | 29/453 |
| 7,237,333 B2 | * | 7/2007 | McAfee | 29/843 |
| 7,351,020 B1 | * | 4/2008 | Notaro et al. | 411/430 |
| 2009/0016847 A1 | * | 1/2009 | Kishida | 411/431 |

* cited by examiner

*Primary Examiner* — Roberta Delisle
(74) *Attorney, Agent, or Firm* — Muncy, Geissler, Olds & Lowe, P.C.

(57) ABSTRACT

An improved fastener includes a fastener body and a blocker. The fastener body has an end functioning as a connecting head, and center of the fastener body forms an axial threaded bore. An end of the axial threaded bore corresponding to the connecting head is formed into a recess surrounded by the connecting head. The blocker is removably fitted in the recess of the fastener body. When the connecting head of the fastener body is extended through a fixing hole on a printed circuit board with the blocker fitted in the recess, solder paste applied over the fixing hole is prevented from entering into the axial threaded bore of the fastener body to interfere with a screw being threaded into the fastener body.

8 Claims, 5 Drawing Sheets

FASTENER

FIELD OF THE INVENTION

The present invention relates to an improved fastener, and more particularly to an fastener that includes a blocker removably fitted in an end thereof to prevent solder paste from entering into the fastener to interfere with a screw being screwed into the fastener.

BACKGROUND OF THE INVENTION

Generally, a fastening device for connecting a printed circuit board with a fixed body includes a nut having an axial threaded bore and an end functioning as an inserting head. When using the nut to connect the printed circuit board with the fixed body, a layer of solder paste is first applied over a fixing hole on the printed circuit board. Then, the inserting head at one end of the nut is placed in the fixing hole on the printed circuit board, so that the inserting head along with the solder paste is fixed in the fixing hole. Thereafter, the fixed body is connected to the printed circuit board by threading a screw into the axial threaded bore from the other end of the nut.

While the above-described conventional fastening device is able to connect the printed circuit board with the fixed body, the axial threaded bore of the nut is not provided with any blocker. Therefore, when the inserting head of the nut is placed in the fixing hole on the printed circuit board and welded thereto, the solder paste applied over the fixing hole tends to enter into the axial threaded bore of the nut when the solder paste is compressed by a rear end of the inserting head and an adsorption effect occurs between an outer plated layer of the nut and a solder bonding layer. As a result, when the screw is screwed into the axial threaded bore of the nut, the screw would be interfered by the solder paste in the axial threaded bore and could not be successfully tightened to the nut, making it inconvenient to connect the printed circuit board with the fixed body.

SUMMARY OF THE INVENTION

A primary object of the present invention is to provide an improved fastener for connecting a printed circuit board with a fixed body, so that solder paste applied over a fixing hole provided on the printed circuit board is prevented from entering into the improved fastener to interfere with a screw being screwed into the improved fastener to connect the fixed body to the printed circuit board.

To achieve the above and other objects, the improved fastener according to the present invention includes a fastener body and a blocker. The fastener body has an end functioning as a connecting head, and center of the fastener body forms an axial threaded bore. An end of the axial threaded bore corresponding to the connecting head is a recess surrounded by the connecting head. The blocker is removably fitted in the recess of the fastener body. When the connecting head of the fastener body is extended through a fixing hole on a printed circuit board with the blocker fitted in the recess, solder paste applied over the fixing hole is prevented from entering into the axial threaded bore of the fastener body to interfere with a screw being threaded into the fastener body.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
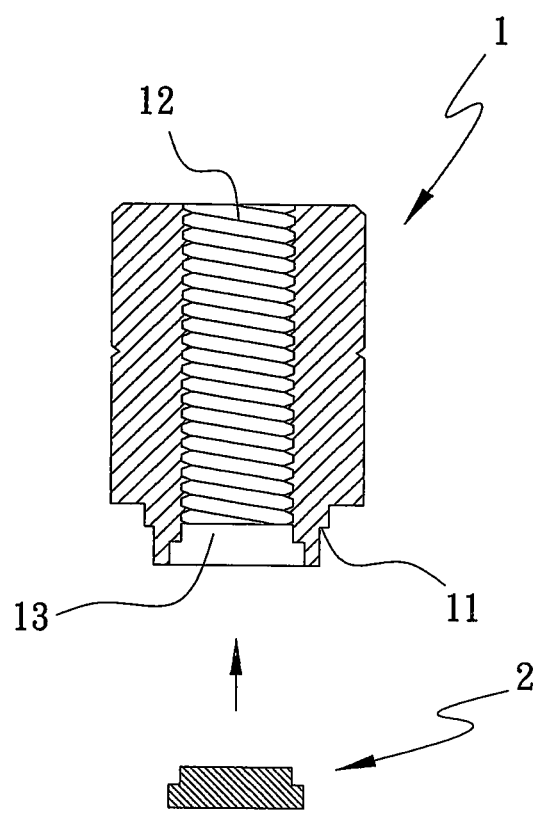
FIG. 1 is an exploded sectional view of an improved fastener according to a preferred embodiment of the present invention.
Figure 2:
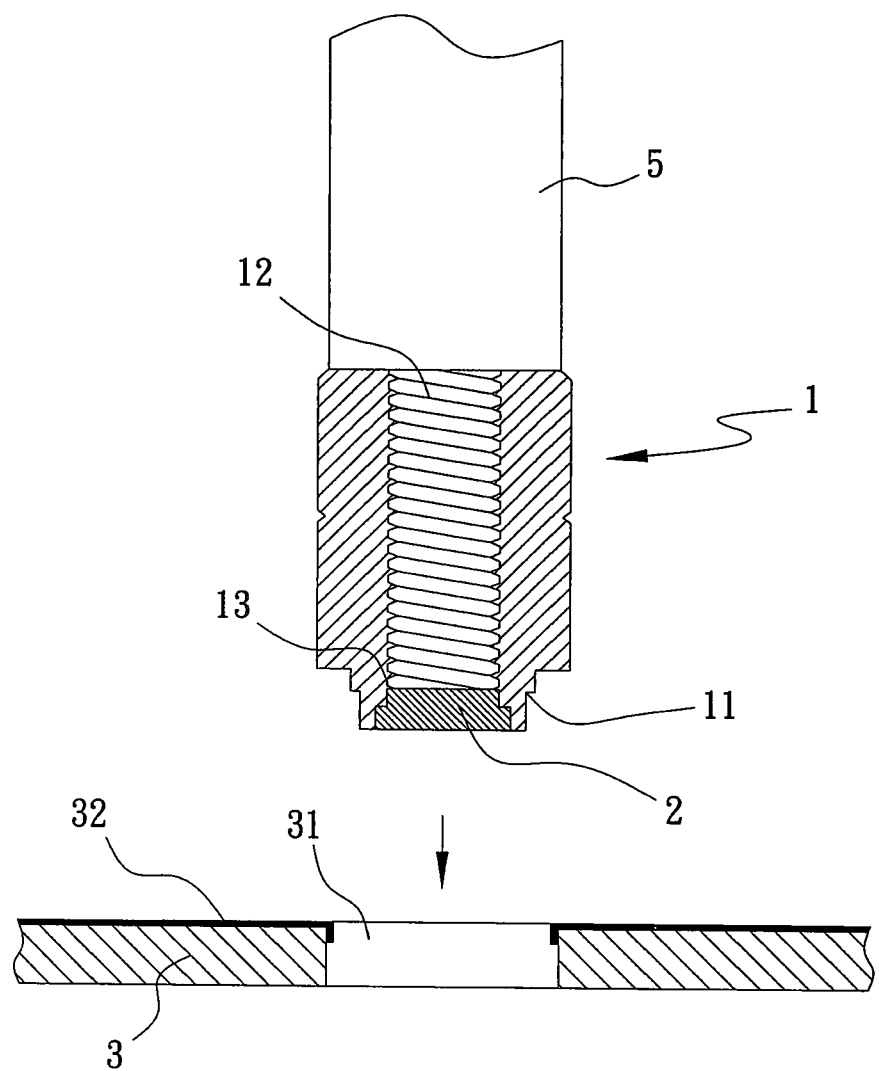
FIGS. 2, 3, 4, and 5 are sectional views showing the use of the improved fastener of the present invention to connect two printed circuit boards to each other.
Figure 3:
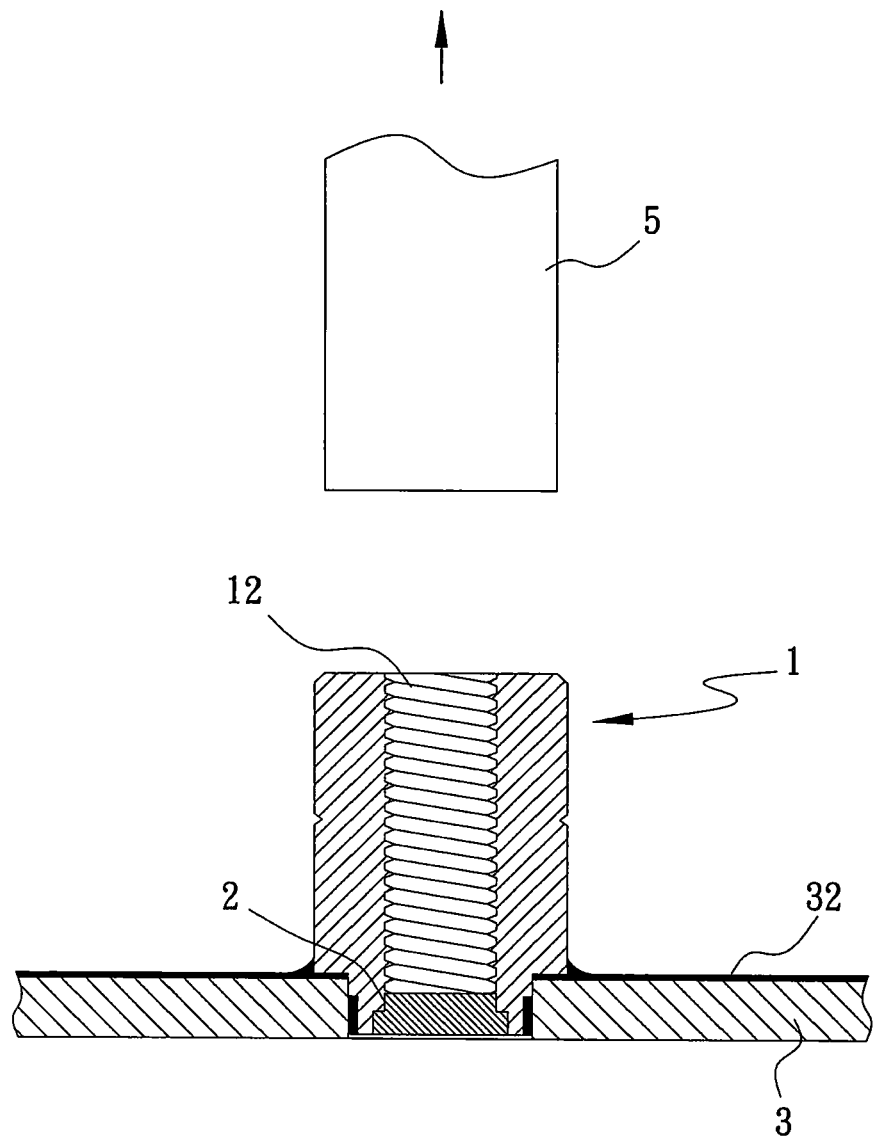
Figure 4:
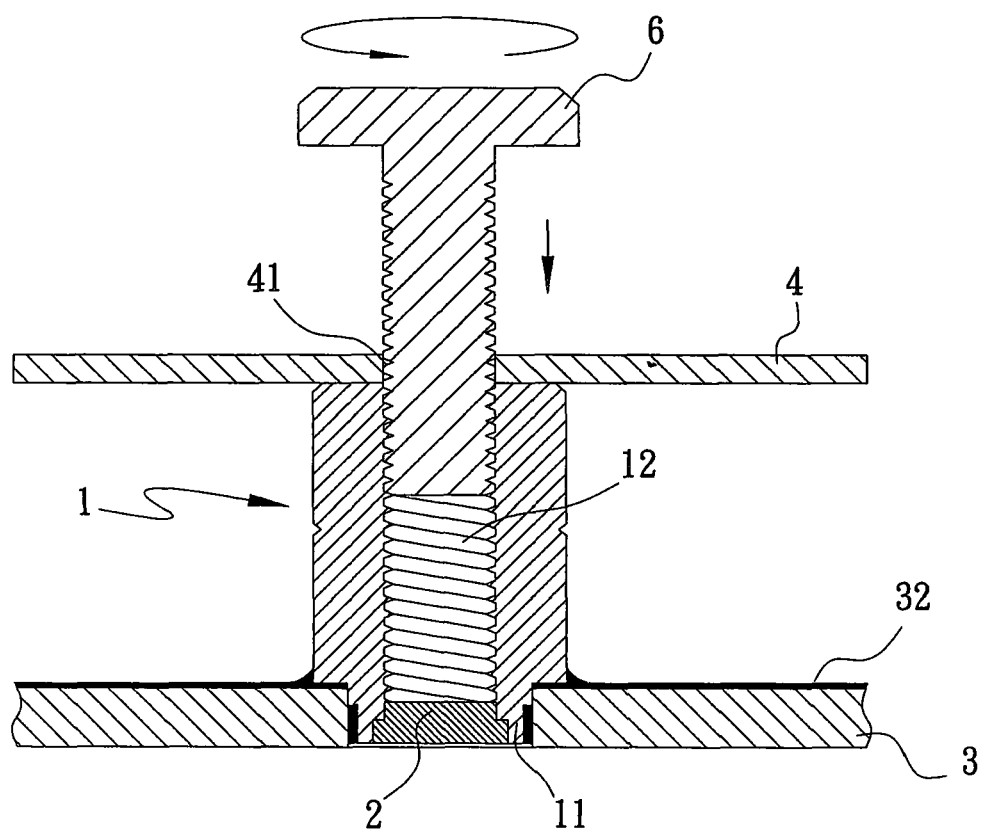
Figure 5:
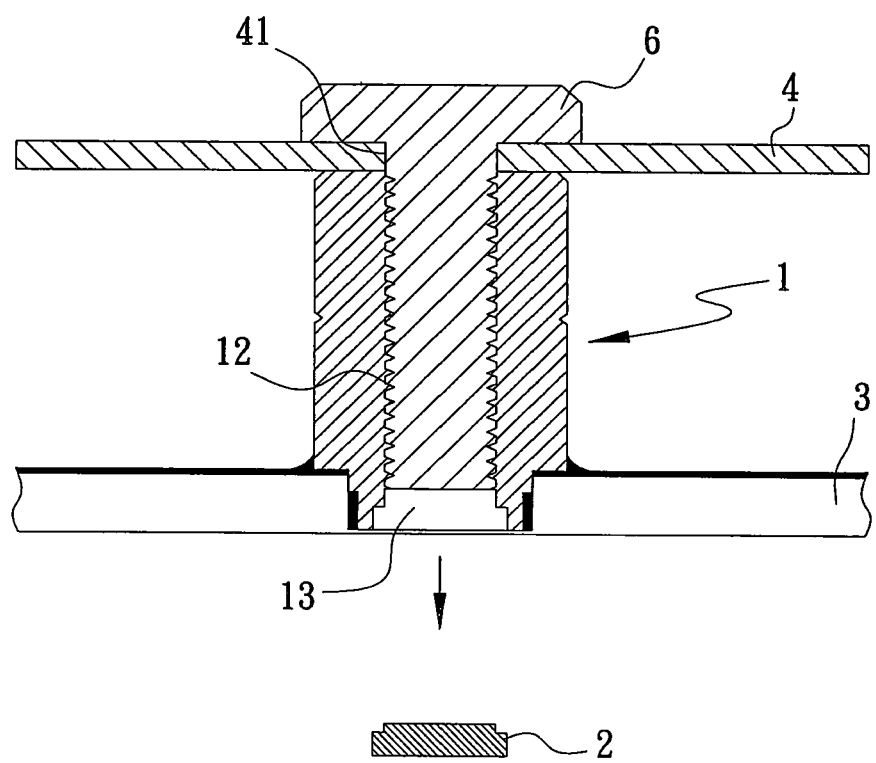

Please refer to FIG. 1, which is an exploded sectional view of an improved fastener according to a preferred embodiment of the present invention. As shown, the improved fastener includes a fastener body 1 and a blocker 2.

The fastener body 1 has an end functioning as a connecting head 11, and center of the fastener body 1 forms an axial threaded bore 12. An end of the axial threaded bore 12 corresponding to the connecting head 11 is formed into a recess 13 surrounded by the connecting head 11.

The blocker 2 is removably fitted in the recess 13 of the fastener body 1. The blocker 2 can be a plug, a plate, or a column in the present invention.

Please refer to FIGS. 2 to 5, which are sectional views showing the use of the improved fastener of the present invention to connect a printed circuit board 3 with a fixed body 4. To do so, first apply a layer of solder paste 32 over a fixing hole 31 provided on the printed circuit board 3. Then, use a vacuum pickup device 5 to suck the fastener body 1, and extend the connecting head 11 through the layer of solder paste 32 into the fixing hole 31. With the blocker 2 fitted in the recess 13, the solder paste 32 is prevented from entering into the axial threaded bore 12 via the connecting head 11 when the same is extended through the solder paste 32. Thereafter, align a through hole 41 provided on the fixed body 4 with another end of the axial threaded bore 12 opposite to the recess 13, and thread a screw 6 through the through hole 41 on the fixed body 4 into the axial threaded bore 12. When the screw 6 reaches at the recess 13, the blocker 2 is pushed outward by the screw 6 to finally separate from the fastener body 1. In this manner, the screw 6 can be fully threaded into the fastener body 1 without being interfered by the solder paste 32.

With the above arrangements, when the improved fastener of the present invention is used to connect the printed circuit board with the fixed body, the blocker can prevent the solder paste from entering into the fastener body to interfere with the screw extended into the fastener body. Therefore, the present invention can effectively eliminate the drawbacks in the conventional fastening device.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An improved fastener, used on a printed circuit board, the printed circuit board having a fixed hole with a layer of solder paste applied over the fixed hole, comprising:
a fastener body having an end functioning as a connecting head, and center of the fastener body forms an axial threaded bore; an end of the axial threaded bore corresponding to the connecting head being formed into a recess surrounded by the connecting head;

the connecting head extending through the layer of solder paste into the fixed hole of the printed circuit board; and a blocker being removably fitted in the recess of the fastener body, and removed after the connecting head extends into the fixed hole.

2. The improved fastener as claimed in claim 1, wherein the blocker is a plug.

3. The improved fastener as claimed in claim 1, wherein the blocker is a plate.

4. The improved fastener as claimed in claim 1, wherein the blocker is a column.

5. The improved fastener as claimed in claim 1, wherein the fastener body extends away from the printed circuit board.

6. The improved fastener as claimed in claim 1, wherein the blocker prevents said solder paste from entering said axial threaded bore through said recess.

7. The improved fastener as claimed in claim 1, wherein said blocker is removable by a screw extending through the axial threaded bore.

8. An improved fastener, used on a printed circuit board, the printed circuit board having a fixed hole with a layer of solder paste applied over the fixed hole, comprising:

a fastener body having an end functioning as a connecting head, and center of the fastener body forms an axial threaded bore; an end of the axial threaded bore corresponding to the connecting head being formed into a recess surrounded by the connecting head; the connecting head extending through the layer of solder paste into the fixed hole of the printed circuit board, a cross section area of the fastener body other than the connecting head being larger than a cross section area of the connecting head and area of the fixed hole; and a blocker being fitted in the recess of the fastener body, and removed after the connecting head extends into the fixed hole.

\* \* \* \* \*